(12) United States Patent
Sanford et al.

(10) Patent No.: US 9,571,150 B2
(45) Date of Patent: Feb. 14, 2017

(54) SCREEN PROTECTION USING ACTUATED BUMPERS

(71) Applicant: Apple Inc., Cupertino, CA (US)

(72) Inventors: Emery A. Sanford, Cupertino, CA (US); Wei Guang Wu, Cupertino, CA (US); Sarah E. Carey, Cupertino, CA (US); Matthew E. Lang, Stratford (CA)

(73) Assignee: Apple Inc., Cupertino, CA (US)

( * ) Notice: Subject to any disclaimer, the term of this patent is extended or adjusted under 35 U.S.C. 154(b) by 24 days.

(21) Appl. No.: 14/284,205

(22) Filed: May 21, 2014

(65) Prior Publication Data

US 2015/0341070 A1 Nov. 26, 2015

(51) Int. Cl.
*H04M 1/02* (2006.01)
*H04B 1/3888* (2015.01)
*H04M 1/18* (2006.01)

(52) U.S. Cl.
CPC ......... *H04B 1/3888* (2013.01); *H04M 1/0202* (2013.01); *H04M 1/185* (2013.01); *H04M 2250/12* (2013.01)

(58) Field of Classification Search
CPC ..... H04M 1/0214; H04M 1/23; H04B 1/3888; F16F 15/00; F16F 15/04
USPC ........... 455/550.1, 575.1, 575.8; 361/679.01, 361/679.03
See application file for complete search history.

(56) References Cited

U.S. PATENT DOCUMENTS

| | | |
|---|---|---|
| 3,606,296 A | 9/1971 | Chassagne |
| 4,278,726 A | 7/1981 | Wieme |
| 4,849,580 A | 7/1989 | Reuter |
| 5,182,158 A | 1/1993 | Schaeffer |
| 5,349,893 A | 9/1994 | Dunn |
| 5,368,914 A | 11/1994 | Barrett |
| 5,426,562 A | 6/1995 | Morehouse et al. |
| 5,587,854 A | 12/1996 | Sato et al. |
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,936,600 A | 8/1999 | Ohashi et al. |
| 5,965,249 A | 10/1999 | Sutton et al. |
| 5,982,617 A | 11/1999 | Haley et al. |
| 6,085,878 A | 7/2000 | Araki et al. |
| 6,154,360 A | 11/2000 | Kaczeus et al. |
| 6,251,493 B1 | 6/2001 | Johnson et al. |

(Continued)

FOREIGN PATENT DOCUMENTS

| | | |
|---|---|---|
| CN | 202444711 | 9/2012 |
| CN | 203119975 | 8/2013 |

(Continued)

*Primary Examiner* — Sam Bhattacharya

(57) ABSTRACT

An electronic device includes at least one screen. One or more bumpers are moveable between at least a stowed position where the bumper is flush or below the screen and a deployed position where at least a portion of the bumper projects above the screen. One or more sensors detect when the electronic device is subject to one or more drop events. When a drop event is detected, the bumper moves to the deployed position, protecting the screen. In various implementations, the bumper may be moveable by a push-push mechanism or a magnet assisted actuator mechanism. In other implementations, the bumper may include piezoelectric material to which voltage can be applied to move the bumper.

20 Claims, 15 Drawing Sheets

(56) References Cited

U.S. PATENT DOCUMENTS

| | | |
|---|---|---|
| 6,262,888 B1 | 7/2001 | Siedow et al. |
| 6,288,489 B1 | 9/2001 | Isohata et al. |
| 6,324,054 B1 | 11/2001 | Chee et al. |
| 6,373,702 B2 | 4/2002 | Oishi et al. |
| 6,524,692 B1 | 2/2003 | Rosen |
| 6,596,976 B2 | 7/2003 | Lin et al. |
| 6,603,620 B1 | 8/2003 | Berding |
| 6,627,818 B2 | 9/2003 | Kamel et al. |
| 6,633,481 B2 | 10/2003 | Pavol |
| 6,647,328 B2 | 11/2003 | Walker |
| 6,664,491 B2 | 12/2003 | Yanai et al. |
| 6,665,192 B2 | 12/2003 | Wimberger Friedl et al. |
| 6,701,529 B1 | 3/2004 | Rhoades et al. |
| 6,744,186 B2 | 6/2004 | Oishi et al. |
| 6,785,566 B1 | 8/2004 | Irizarry |
| 6,809,916 B2 | 10/2004 | Nakata et al. |
| 6,859,357 B2 | 2/2005 | Morimoto et al. |
| 6,871,888 B2 | 3/2005 | Yamagiwa |
| 6,924,996 B2 | 8/2005 | Sugawara |
| 6,968,954 B2 | 11/2005 | Hsieh |
| 7,009,835 B2 | 3/2006 | Desai et al. |
| 7,059,182 B1 | 6/2006 | Ragner |
| 7,094,094 B2 | 8/2006 | Zahnen et al. |
| 7,113,351 B2 | 9/2006 | Hovanky |
| 7,133,281 B2 | 11/2006 | Bae |
| 7,167,360 B2 | 1/2007 | Inoue et al. |
| 7,193,581 B2 | 3/2007 | Tyler et al. |
| 7,259,357 B2 | 8/2007 | Walker |
| 7,260,885 B2 | 8/2007 | Albrecht et al. |
| 7,369,345 B1 | 5/2008 | Li et al. |
| 7,373,863 B2 | 5/2008 | O'Banion et al. |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,532,478 B2 | 5/2009 | Jeong |
| 7,554,798 B2 | 6/2009 | Tanokuchi et al. |
| 7,568,942 B1 | 8/2009 | Lannon et al. |
| 7,612,994 B2 | 11/2009 | Ulrich et al. |
| 7,619,891 B2 | 11/2009 | Woo et al. |
| 7,643,243 B2 | 1/2010 | Lee et al. |
| 7,652,892 B2 | 1/2010 | Shiu et al. |
| 7,660,107 B2 | 2/2010 | Leung |
| 7,677,538 B2 | 3/2010 | Darnell et al. |
| 7,684,183 B2 | 3/2010 | Mori et al. |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 8,075,981 B2 | 12/2011 | Pearce et al. |
| 8,093,811 B2 | 1/2012 | Tanokuchi et al. |
| 8,106,789 B2 | 1/2012 | Yang et al. |
| 8,113,494 B2 | 2/2012 | Sunder |
| 8,144,453 B2 | 3/2012 | Brown et al. |
| 8,189,280 B2 | 5/2012 | Ollila et al. |
| 8,190,015 B2 | 5/2012 | Li et al. |
| 8,248,777 B2 | 8/2012 | Prest |
| 8,289,689 B2 | 10/2012 | Chen et al. |
| 8,289,715 B2 | 10/2012 | Takahara |
| 8,297,601 B2 | 10/2012 | Vito et al. |
| 8,305,744 B2 | 11/2012 | Shedletsky et al. |
| 8,330,305 B2 | 12/2012 | Hart et al. |
| 8,352,077 B2 | 1/2013 | Goswami et al. |
| 8,411,432 B1 | 4/2013 | Zimlin et al. |
| 8,446,475 B2 | 5/2013 | Topliss et al. |
| 8,467,133 B2 | 6/2013 | Miller |
| 8,485,053 B2 | 7/2013 | Lee et al. |
| 8,503,121 B2 | 8/2013 | Osaka et al. |
| 8,564,424 B2 | 10/2013 | Evarts et al. |
| 9,116,668 B2 | 8/2015 | Xiaozhuo et al. |
| 2003/0168790 A1 | 9/2003 | Larson |
| 2005/0017396 A1 | 1/2005 | Pearce et al. |
| 2006/0109581 A1 | 5/2006 | Lee et al. |
| 2008/0024972 A1 | 1/2008 | Yamaguchi |
| 2008/0091309 A1 | 4/2008 | Walker |
| 2008/0192124 A1 | 8/2008 | Nagasaki |
| 2009/0273480 A1 | 11/2009 | Mittleman et al. |
| 2010/0149073 A1 | 6/2010 | Chaum et al. |
| 2010/0164152 A1 | 7/2010 | Li |
| 2010/0272969 A1 | 10/2010 | Taylor |
| 2011/0228460 A1 | 9/2011 | Kim et al. |
| 2011/0257765 A1 | 10/2011 | Evans et al. |
| 2012/0212484 A1 | 8/2012 | Haddick et al. |
| 2012/0212499 A1 | 8/2012 | Haddick et al. |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0100591 A1 | 4/2013 | Montevirgen et al. |
| 2013/0127980 A1 | 5/2013 | Haddick et al. |
| 2013/0257582 A1 | 10/2013 | Rothkopf et al. |
| 2013/0278631 A1 | 10/2013 | Border et al. |
| 2013/0285490 A1 | 10/2013 | Rothkopf et al. |
| 2014/0066122 A1 | 3/2014 | Shukla et al. |
| 2015/0318462 A1* | 11/2015 | Kim .............. H01L 41/193 310/332 |
| 2015/0331456 A1 | 11/2015 | Moon |
| 2016/0018223 A1 | 1/2016 | Stryker et al. |

FOREIGN PATENT DOCUMENTS

| | | |
|---|---|---|
| GB | 1133198 | 11/1968 |
| JP | 2008067160 | 3/2008 |
| JP | 2009104407 | 5/2009 |
| JP | 2011099758 | 5/2011 |
| WO | WO2010/135421 | 11/2010 |

* cited by examiner

SCREEN PROTECTION USING ACTUATED BUMPERS

TECHNICAL FIELD

This disclosure relates generally to electronic devices with screens, and more specifically to protection of electronic device screens.

BACKGROUND

Electronic devices, particularly portable electronic devices, may include one or more screens. Such screens may include touch screens, display screens, touch pad screens, and/or other types of electronic device screens. Typically, such screens include one or more fragile elements such one or more layers of glass and/or other similarly fragile elements.

Electronic devices, particularly electronic devices that are portable, may experience various drop events. For example, an electronic device may be dropped by a user, fall from a table, fly from a user's hand when a user trips, and/or otherwise free fall to the ground or other surface. Drop events of these or other kinds may damage fragile elements of screens such as glass layers and repairing damage to screens may be burdensome, expensive, and/or impractical.

SUMMARY

The present disclosure discloses systems, apparatuses and methods for screen protection. An electronic device may include at least one screen (or cover glass). One or more bumpers may be moveable between at least a stowed position where the bumper is flush or below the screen and a deployed position where at least a portion of the bumper projects above the screen. One or more sensors may detect when the electronic device is subject to one or more drop events. When a drop event is detected, the bumper may move to the deployed position, protecting the screen.

In various implementations, the bumper may be pivotably mounted to be moveable between the stowed and deployed positions. In such implementations, the bumper may be biased toward the stowed position, such as by one or more springs, and may be forced into the deployed position by movement of one or more wedges. In one or more embodiments of such an implementation, the wedge may be a component in a push-push mechanism driven by one or more actuators. The wedge may be mounted on one or more cams that travel in one or more cam paths when driven by the actuator. In one or more other embodiments of such an implementation, the wedge may be a component in a magnet assisted actuator mechanism. The wedge may be moveably mounted such that the wedge may slide in at least two directions when driven by an actuator.

In other implementations, the bumper may be formed of one or more piezoelectric materials. Such piezoelectric materials may be operable to expand when voltage is applied such that application of voltage moves the bumper from the stowed position to the deployed position. Conversely, withdrawal of applied voltage may move the bumper from the deployed position to the stowed position.

In various embodiments, a system for screen protection includes an electronic device including at least one screen; at least one bumper moveable between at least a stowed position and a deployed position wherein at least a portion of the at least one bumper projects above the at least one screen in the deployed position; and at least one sensor that detects when electronic device is subject to a drop event. The at least one bumper moves from the stowed position to the deployed position when the at least one sensor detects that the electronic device is subject to the drop event.

In one or more embodiments, an electronic device includes at least one screen; at least one bumper moveable between at least a stowed position and a deployed position wherein at least a portion of the at least one bumper projects above the at least one screen in the deployed position; and at least one sensor that detects when electronic device is subject to a drop event. The at least one bumper moves from the stowed position to the deployed position when the at least one sensor detects that the electronic device is subject to the drop event.

In some embodiments, a method for screen protection includes: detecting when an electronic device that includes at least one screen is subject to a drop event utilizing at least one sensor and moving at least one bumper from a stowed position to a deployed position in response to detection of the at least one drop event, the at least one bumper projects above the at least one screen in the deployed position.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1A:
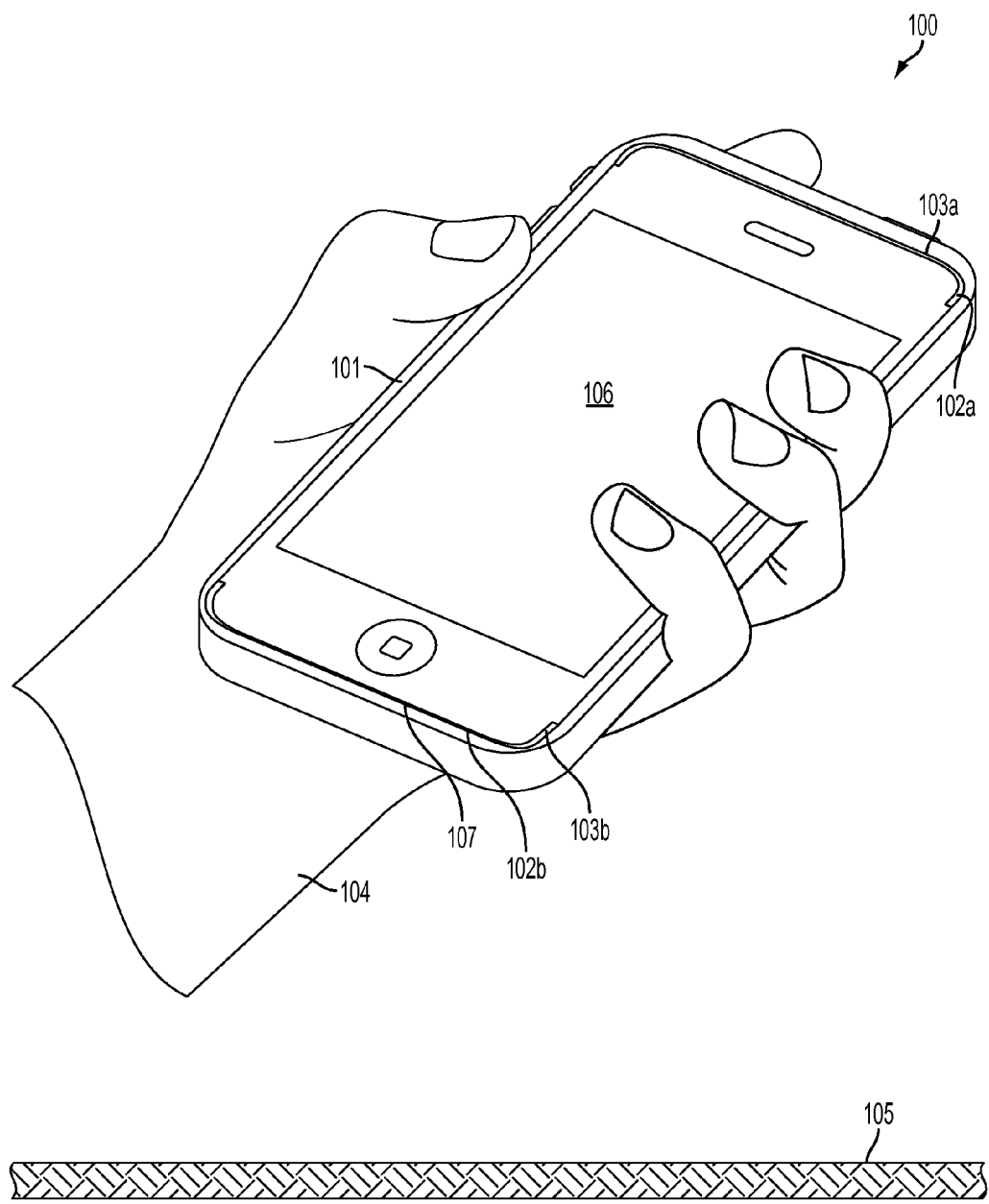
FIG. 1A is an isometric view illustrating a first example system for screen protection.

The description that follows includes sample systems, methods, and computer program products that embody various elements of the present disclosure. However, it should be understood that the described disclosure may be practiced in a variety of forms in addition to those described herein.

The present disclosure discloses systems, apparatuses and methods for screen protection. An electronic device may include at least one screen (or cover glass). One or more bumpers may be moveable between at least a stowed position where the bumper is flush or below the screen and a deployed position where at least a portion of the bumper projects above the screen. One or more sensors (such as an accelerometer, gyroscope, inertial sensor, motion sensor, camera, and/or other sensor and/or a combination thereof) may detect when the electronic device is subject to one or more drop events. When a drop event is detected, the bumper may move to the deployed position. In this way, the bumper may function as a shock absorber and prevent the screen from contacting a surface onto which the electronic device is dropped, protecting the screen.

In various implementations, the bumper may be pivotably mounted to be moveable between the stowed and deployed positions. In such implementations, the bumper may be biased toward the stowed position, such as by one or more springs, and may be forced into the deployed position by movement of one or more wedged.

In one or more embodiments of such an implementation, the wedge may be a component in a push-push mechanism driven by one or more actuators. The wedge may be mounted on one or more cams that travel in one or more cam paths when driven by the actuator (such as a linear motor, a single direction linear motor, and so on).

When the wedge is in a stowed wedge position and is pushed by the actuator, the cams may travel in the cam paths such that the wedge moves past a deployed wedge position to an over-travel wedge position and then back to the deployed wedge position when no longer pushed by the actuator. As part of such operation, the cams may travel from a stowed cam path position to a first (or deploying) over-travel cam path position and then to a deployed cam path position. When the actuator again pushes the wedge, the cams may travel in the cam paths such that the wedge moves back to the over-travel wedge position and then back to the stowed wedge position when no longer pushed by the actuator. As part of such operation, the cams may travel from a deployed cam path position to a second (or stowing) over-travel cam path position and then to a stowed cam path position.

In one or more other embodiments of such an implementation, the wedge may be a component in a magnet assisted actuator mechanism. The wedge may be moveably mounted (such as on one or more linear bearings on one or more rails) such that the wedge may slide in at least two directions when driven by an actuator (such as a linear motor).

When the wedge is in a stowed wedge position, the actuator may push the wedge in a first direction to an intermediate wedge position. From the intermediate wedge position, one or more magnetic elements coupled to the wedge may attract one or more other magnetic elements (such as magnetic elements coupled to a housing of the electronic device) to pull the wedge from the intermediate wedge position to a deployed wedge position. From the deployed wedge position, the actuator may push the wedge in a second direction, breaking the attraction of the magnetic elements and moving the wedge through the intermediate wedge position back to the stowed wedge position.

In other implementations, the bumper may be formed of one or more piezoelectric materials. Such piezoelectric materials may be operable to expand when voltage is applied such that application of voltage moves the bumper from the stowed position to the deployed position. Conversely, withdrawal of applied voltage may move the bumper from the deployed position to the stowed position.

In some implementations, the bumper may be positioned at least partially around two or more sides of the screen, such as around one or more corners of the screen. In some cases, the bumper may surround the entire side perimeter of the screen.

In various implementations, the bumper, the sensor, and/or one or more other components discussed above may be incorporated into the electronic device. However, in other implementations the bumper, the sensor, and/or one or more other components discussed above may be incorporated into a case, cover, or other element that is coupled to the electronic device. In such implementations, the bumper may be deployable to protect a screen of the electronic device when the case, cover, or other element is coupled to the electronic device.

In some implementations, after the bumper moves to the deployed position in response to the sensor detecting a drop event, the bumper may return to the stowed position. In various cases, the bumper may return to the stowed position when the sensor detects that the drop event is over, in response to one or more user inputs, upon expiration of a timer after the drop event is detected, when the sensor determines the electronic device is retrieved after the drop event, and/or at various other times subsequent to a drop event.

FIG. 1A is an isometric view illustrating a first example system 100 for screen protection. As illustrated, a user 104 is holding an electronic device 101 above a surface 105. In this example, the surface is the ground. However, it is understood that this is an example and the surface may be any surface (such as a table top, counter, floor, and so on) onto which the electronic device may experience a drop event. The electronic device 101 may include one or more housings 107, one or more screens 106, and one or more aperture 103a-103b through which one or more bumpers 102a may extend from a stowed position (as shown in FIG. 1A) to a deployed position (see FIG. 1B).

Though the electronic device 101 is illustrated as a smart phone with a single screen 106, it is understood that this is an example. In various implementations, the electronic device may be any kind of electronic device (such as a smart phone, cellular telephone, tablet computing device, digital media player, mobile computing device, laptop computing device, wearable device, and/or other such electronic device) that includes one or more screens without departing from the scope of the present disclosure. Further, though the screen is illustrated as a touch screen/display, it is understood that this is an example. In various implementations, the screen may be any kind of screen (such as one or more displays, touch screens, touch pads, and/or any other kind of screen device) without departing from the scope of the present disclosure.

Figure 1B:
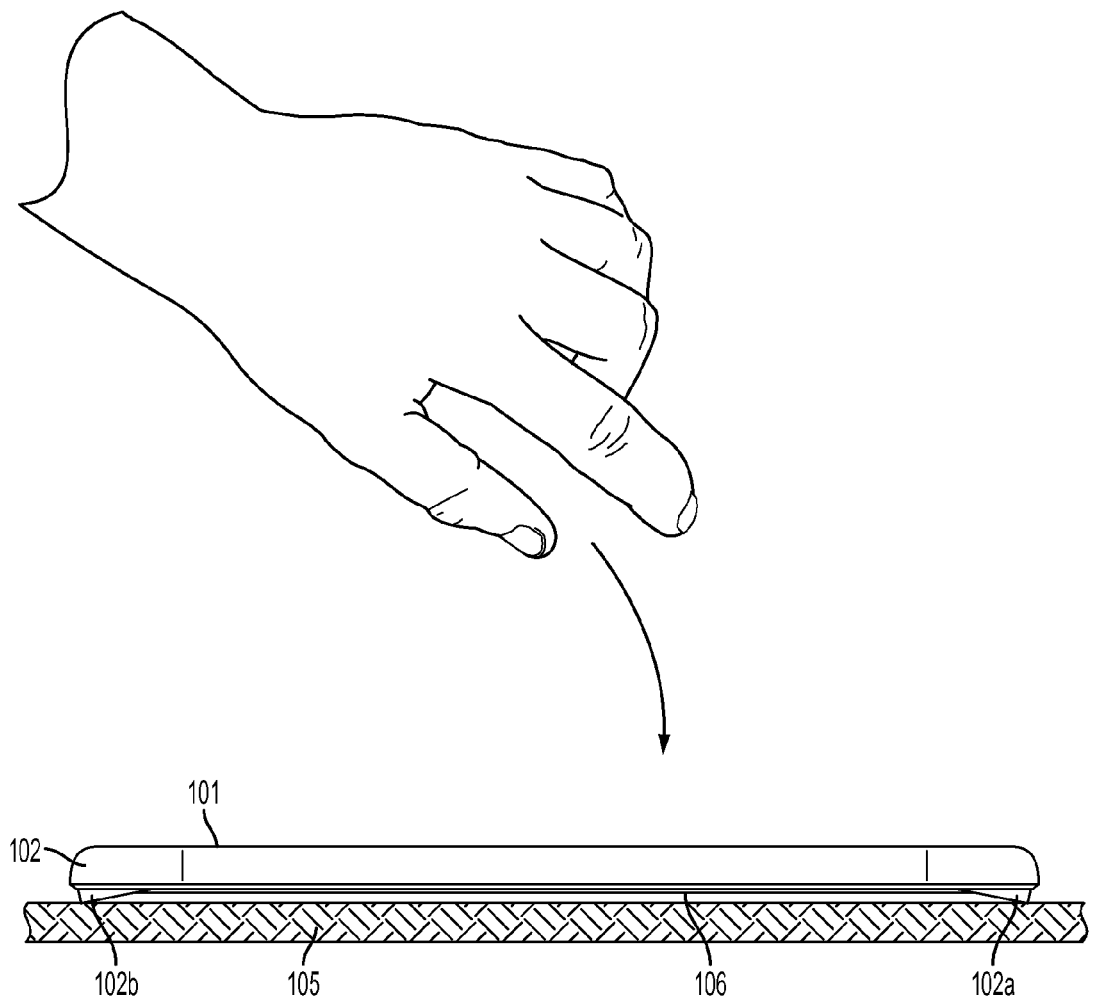
FIG. 1B illustrates the example system of FIG. 1A after occurrence of a drop event.

FIG. 1B illustrates the first example system 100 of FIG. 1A after occurrence of a drop event. Such a drop event may be detected by one or more sensors such as an accelerometer, gyroscope, inertial sensor, motion sensor, camera, and/or other sensor and/or a combination thereof. As illustrated, the user 104 may lose control of the electronic device 101, causing the electronic device to fall to the surface 105.

For example, the sensor(s) may include one or more cameras that capture image data that is analyzed by a processing unit (such as utilizing motion capture software) to detect the occurrence of a drop event based on determined proximity of the electronic device 101 to the surface 105 (such as increasing proximity compared to previously captured image data), velocity of the electronic device, altitude of the electronic device, and so on. By way of another example, the sensor(s) may include one or more accelerometers that capture acceleration data that is analyzed by a processing unit to detect the occurrence of a drop event based on determined acceleration or velocity of the electronic device. By way of still another example, the sensor(s) may include one or more audio components that emit a chirp or ultrasonic pulse and receive a reflection of such from the surface that is analyzed by a processing unit to detect the occurrence of a drop event based on determined height, speed, and so on of the electronic device. By way of yet another example, the sensor(s) may include one or more altitude sensors (such as a global positioning system sensor and/or other kind of sensor operable to detect altitude) that detect altitude data that is analyzed by a processing unit to detect the occurrence of a drop event based on determined altitude, velocity, and so on of the electronic device.

Although FIG. 1B illustrates a drop event as a user 104 dropping the electronic device 101 onto the surface 105, it is understood that this is an example. A drop event may be any set or sets of circumstances that causes an electronic device to contact a surface with force sufficient to potentially damage the screen 106. For example, the user may throw the electronic device at the surface, the electronic device may slip from a different surface onto the surface, and so on. Illustration and description of a drop event as the dropping of the electronic device onto the surface does not limit the scope of the present disclosure.

One or more processing units may receive signals from the sensor(s) that the processing unit interprets as signaling the occurrence of a drop event. The processing unit may then activate one or more motors, actuators, and/or other mechanisms to move the bumpers 102a-102b from the stowed position to the deployed position. In the stowed position, the bumpers may contact the surface, thus preventing the screen 106 and/or the electronic device 101 from contacting the surface. The bumpers (which may be flexible) may therefore act as shock absorbers, absorbing the force of the electronic device 101 impacting the surface and protecting the screen from potential damage.

In various implementations, one or more elements may prevent the bumpers 102a-102b from returning to the stowed position from the deployed position due to the application of force. As such, the bumpers may not return to the stowed position upon impact, enabling the screen 106 to contact the surface despite the bumpers.

Figure 2:
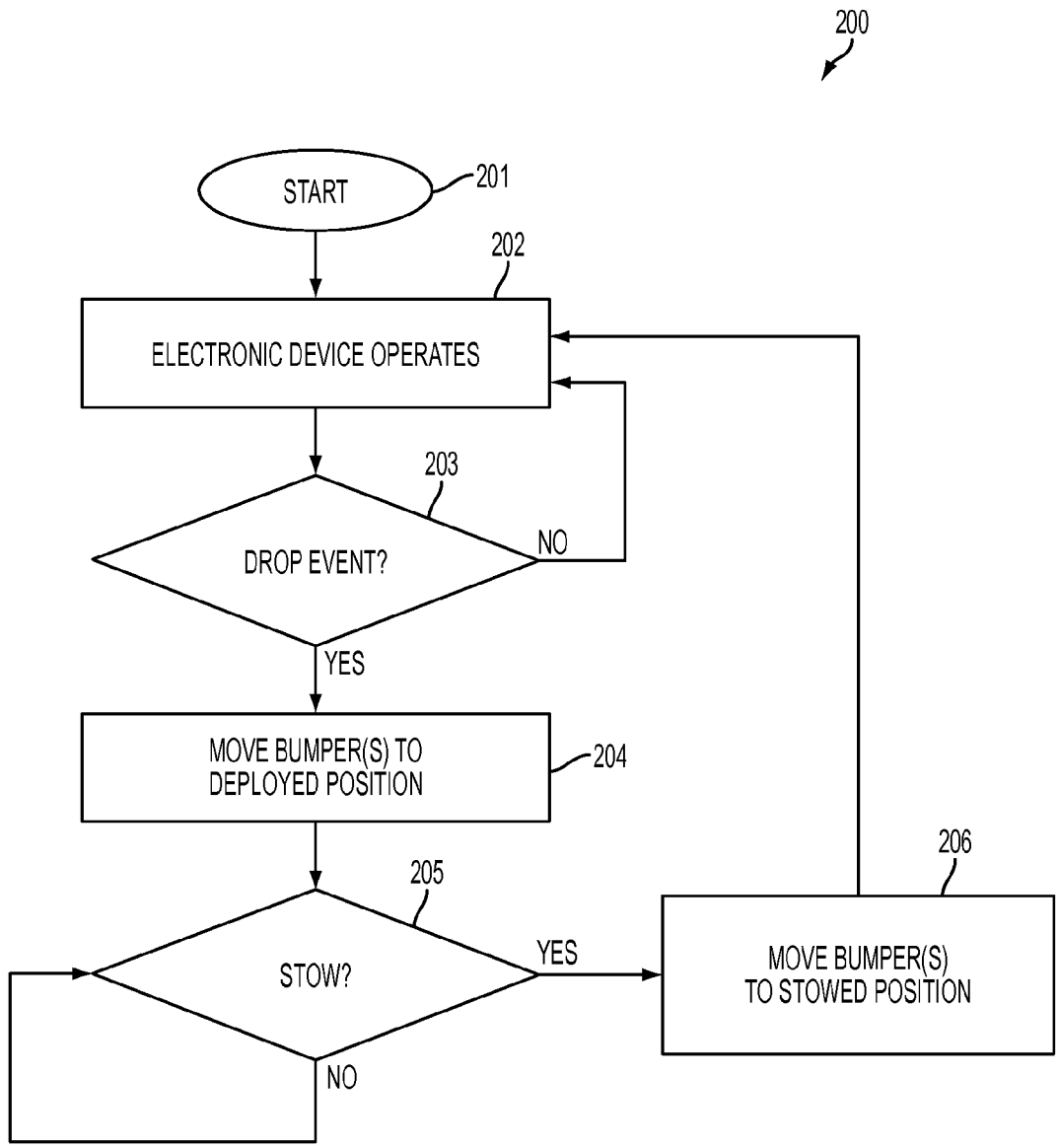
FIG. 2 is a flow chart illustrating an example method for screen protection. This method may be performed by one or more of the example systems of FIGS. 1A-7.

FIG. 2 is a flow chart illustrating an example method 200 for screen protection. This method may be performed by one or more of the example systems of FIGS. 1A-7.

The flow begins at block 201 and proceeds to block 202 where an electronic device may operate. The flow then proceeds to block 203 where one or more sensors (such as an accelerometer, gyroscope, inertial sensor, motion sensor, camera, and/or other sensor and/or a combination thereof) may determine whether or not the electronic device is subject to one or more drop events. If so, the flow proceeds to block 204. Otherwise, the flow returns to block 202 where the electronic device continues to operate.

At block 204, after the sensor determines that the electronic device is subject to a drop event, one or more bumpers may move from a stowed to a deployed position. The flow then proceeds to block 205.

At block 205, after the bumper moves from the stowed to the deployed position, it may be determined whether or not to move the bumper back from the deployed position to the stowed position. In various cases, the bumper may return to the stowed position when the sensor detects that the drop event is over, in response to one or more user inputs, upon expiration of a timer after the drop event is detected, when the sensor determines the electronic device is retrieved after the drop event, and/or at various other times subsequent to a drop event. If so, the flow proceeds to block 206. Otherwise, the flow returns to block 205 where it may be determined whether or not to move the bumper back from the deployed position to the stowed position.

At block 206, after it is determined to move the bumper back from the deployed position to the stowed position, the bumper is returned to the stowed position. The flow then returns to block 202 where the electronic device continues to operate.

Figure 3A:
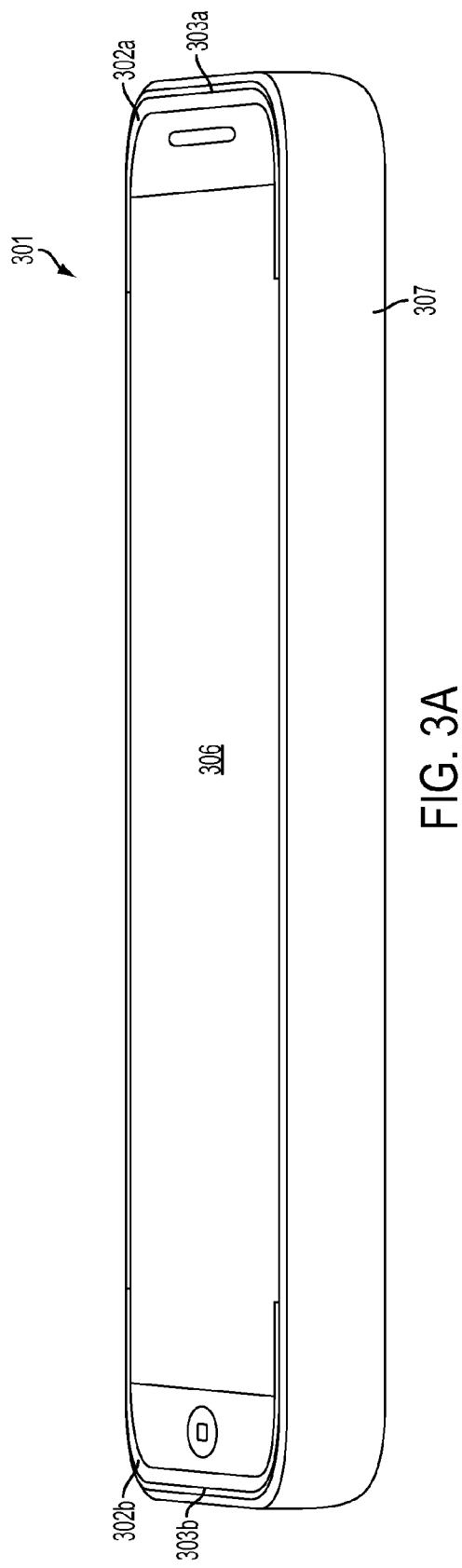
FIG. 3A is an isometric view of a first example of an electronic device that may be used in the example system of FIG. 1A.
Figure 3B:
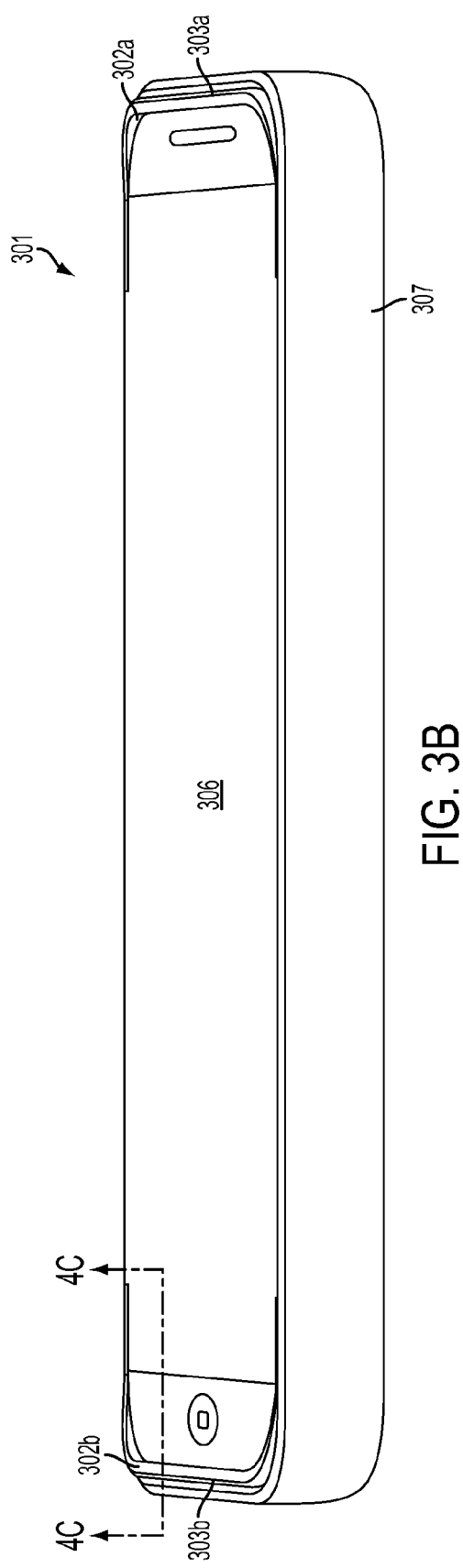
FIG. 3B illustrates the view shown in FIG. 3A with the bumpers in the deployed position.

FIG. 3A is an isometric view of a first example of an electronic device 301 that may be used in the example system 100 of FIG. 1A. As illustrated, the electronic device 301 includes a housing 307, a screen 306, and bumpers 302a-302b that are operable to at least partially extend through apertures 303a-303b. As illustrated, the bumpers 302a-302b are in the stowed position where they are flush (or below) the screen 306). FIG. 3B illustrates the view shown in FIG. 3A with the bumpers 302a-302b in the deployed position where the bumpers 302a-302b project above (or stand proud of) the screen 306.

Figure 4A:
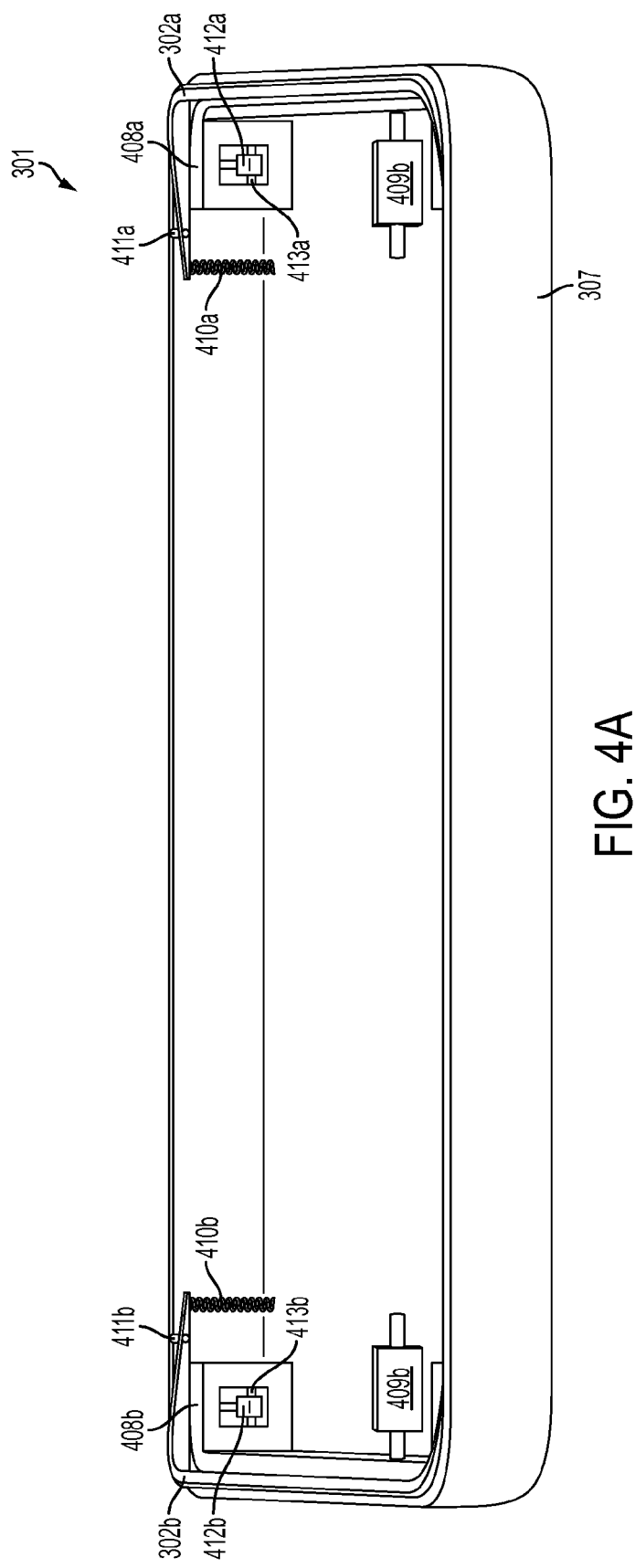
FIG. 4A illustrates a first embodiment of first example electronic device as shown in FIG. 3B with the screen and various internal elements removed for clarity so that operation of the push-push mechanism can be better seen.

FIG. 4A illustrates a first embodiment of first example electronic device 301 as shown in FIG. 3B with the screen 106 and various internal elements removed for clarity so that operation of the push-push mechanism (which may include actuators 409a-409b, wedge 408a-408b, and cams 412a-412b that are pivotally 413a-413b mounted to the wedges 408a-408b and couple to cam paths 414a-414b shown in FIGS. 4B and 4F-4I) can be better seen. The bumpers 302a-302b may be pivotably 411a-411b mounted to be moveable between the stowed and deployed positions. The bumpers 302a-302b may be biased toward the stowed position, such as by the springs 410a-410b.

Figure 4B:
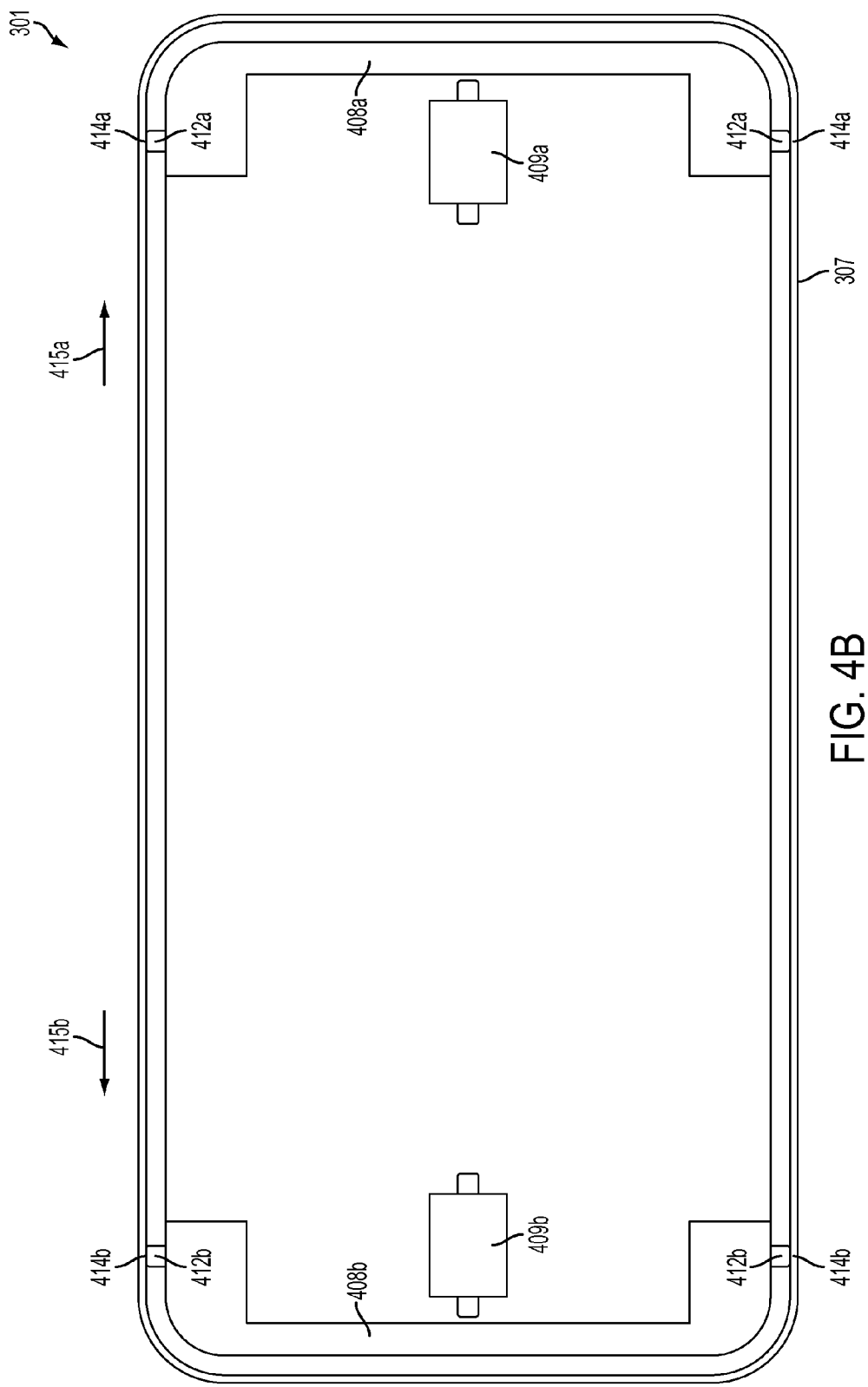
FIG. 4B is a top plan view of the view shown in FIG. 4A with the bumpers, pivots, and springs removed for clarity so that operation of the push-push mechanism can be better seen.

FIG. 4B is a top plan view of the view shown in FIG. 4A with the bumpers 302a-302b, pivots 411a-411b, and springs 410a-410b removed for clarity so that operation of the push-push mechanism can be better seen. As illustrated, the cams 412a-412b connect to cam paths 414a-414b. The actuators 409a-409b (which may be linear motors, single direction linear motors, and so on) may be operable to push the wedges 408a-408b. The actuator 409a may be operable to push the wedge 408a in a direction 415a and the actuator 409b may be operable to push the wedge 408b in a direction 415b.

Although the actuators 409a-409b, cams 412a-412b, and other mechanical elements are illustrated and described as being oriented in particular directions and moving in particular ways, it is understood that this is an example. In various implementations involving such actuators, cams, and other mechanical elements, such may be oriented in and/or move in different ways without departing from the scope of the present disclosure.

Figure 4C:
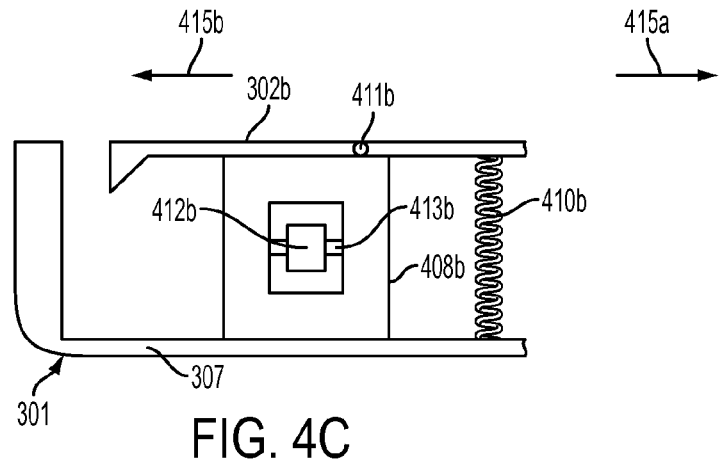
FIG. 4C is a cross sectional view of the first embodiment of the example electronic device of FIG. 4A taken along the line 4C-4C of FIG. 3B while the wedge is in the stowed wedge position.

FIG. 4C is a cross sectional view of the first embodiment of the example electronic device 301 of FIG. 4A taken along the line 4C-4C of FIG. 3B while the wedge 408b is in the stowed wedge position. As illustrated, the wedge 408b does not exert force on the bumper 302b while in the stowed wedge position. As such, the spring 410b biases the bumper 302b to the stowed position.

Figure 4D:
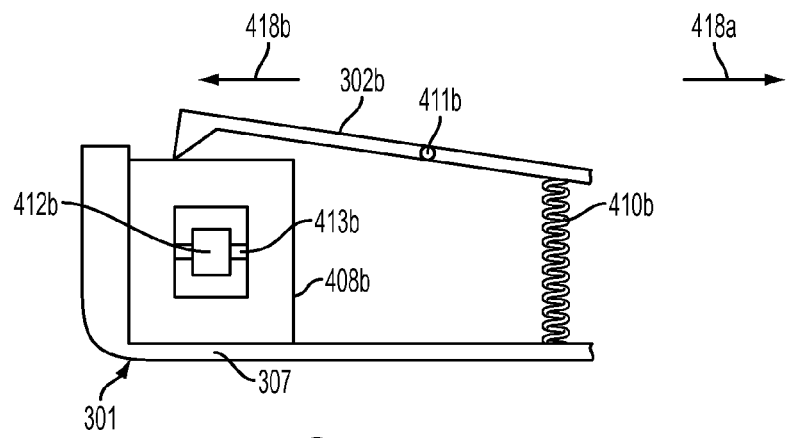
FIG. 4D illustrates the view of FIG. 4C while the wedge is in the over-travel wedge position.
Figure 4E:
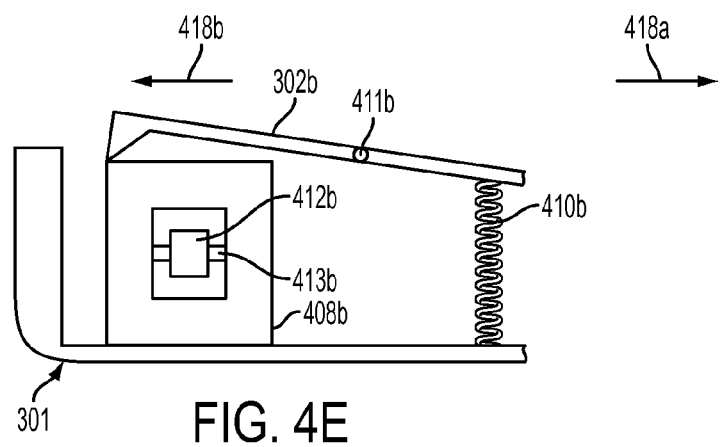
FIG. 4E illustrates the view of FIG. 4D while the wedge is in the deployed wedge position.

When the actuator 409b pushes the wedge 408b in the direction 415b while the wedge 408b is in the stowed position, the wedge 408b may move to the over-travel wedge position shown in FIG. 4D. As illustrated, such movement may cause the wedge 408b to force the bumper 302b into the deployed position, pivoting the bumper 302b on the pivot 411b and compressing the spring 410b. Subsequently, when the actuator 409b no longer pushes the wedge 408b, the wedge may travel back to the deployed wedge position shown in FIG. 4E. As shown, the wedge 408b still forces the bumper 302b into the deployed position while the wedge 408b is in the deployed position.

Similarly, when the actuator 409b pushes the wedge 408b in the direction 415b while the wedge 408b is in the deployed position, the wedge 408b may move to the over-travel wedge position shown in FIG. 4D. Subsequently, when the actuator 409b no longer pushes the wedge 408b, the wedge may travel back to the stowed wedge position shown in FIG. 4C.

Figure 4F:
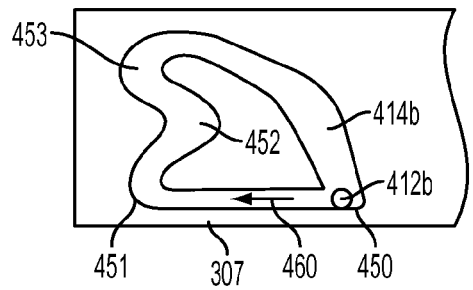
FIG. 4F is a cross sectional view taken along the line 4F-4F of FIG. 4B illustrating the position of the cam in the cam path in the stowed cam path position.
Figure 4G:
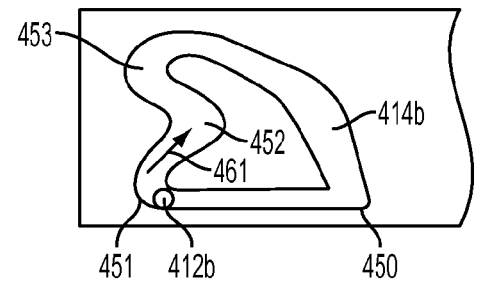
FIG. 4G illustrates the view of FIG. 4F after the cam moves in the cam path from the stowed cam path position to the deploying over-travel cam path position.
Figure 4H:
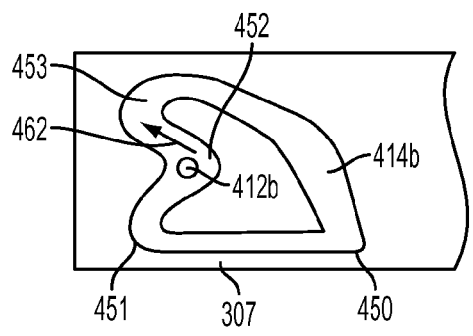
FIG. 4H illustrates the view of FIG. 4G after the cam moves in the cam path from the deploying over-travel cam path position to the deployed cam path position.

FIG. 4F is a cross sectional view taken along the line 4F-4F of FIG. 4B illustrating the position of the cam 412b in the cam path 414b in the stowed cam path position 450. When the actuator 409b pushes the wedge 408b in the direction 415b while the wedge 408b is in the stowed position, the cam 412b may move in the direction 460 to a first (or deploying) over-travel cam path position 451, as shown in FIG. 4G. Subsequently, when the actuator 409b no longer pushes the wedge 408b, the cam 412b may move in the direction 461 to a deployed cam path position 452, as shown in FIG. 4H.

While the cam 412b is in the deployed cam path position 452, the cam path 414b may restrict movement of the cam 412 back toward the deploying over-travel cam path position 451. This may in turn restrict movement of the wedge 408b back toward the stowed wedge position, which in turn may restrict the bumper 302b from moving back to the stowed position. As such, the bumper 302b may not return to the stowed position upon impact and cause the screen 306 to contact a surface despite the bumper 302b.

Figure 4I:
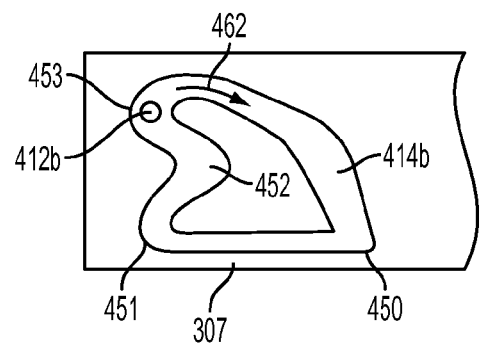
FIG. 4I illustrates the view of FIG. 4H after the cam moves in the cam path from the deployed cam path position to the stowing over-travel cam path position.

When the actuator 409b pushes the wedge 408b in the direction 415b while the wedge 408b is in the deployed position, the cam 412b may move in the direction 462 to a second (or stowing) over-travel cam path position 453, as shown in FIG. 4I. Subsequently, when the actuator 409b no longer pushes the wedge 408b, the cam 412b may move in the direction 463 to the stowed cam path position 450, as shown in FIG. 4F.

Figure 5A:
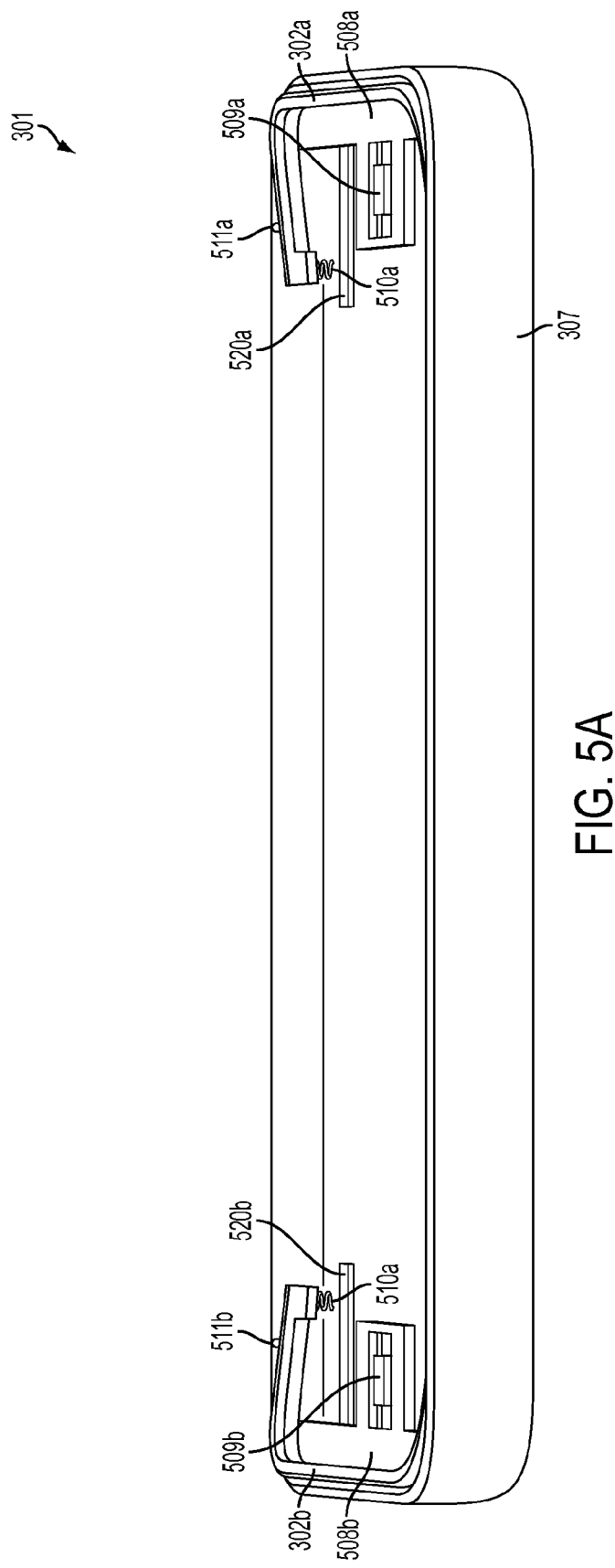
FIG. 5A illustrates a second embodiment of first example electronic device as shown in FIG. 3B with the screen and various internal elements removed for clarity so that operation of the magnet assisted actuator mechanism can be better seen.
Figure 5B:
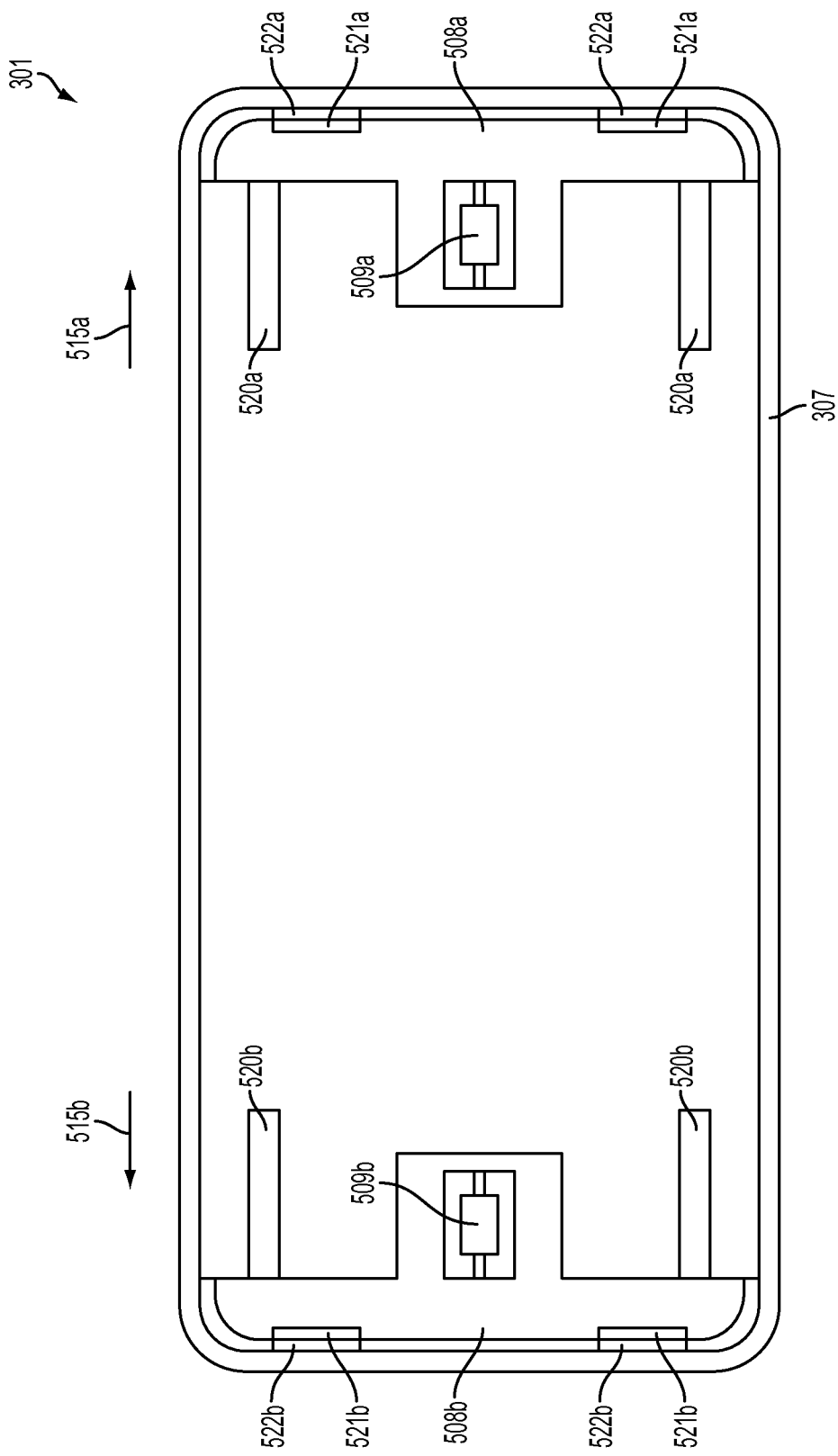
FIG. 5B is a top plan view of the view shown in FIG. 5A with the bumpers, pivots, and springs removed for clarity so that operation of the magnet assisted actuator mechanism can be better seen.

FIG. 5A illustrates a second embodiment of first example electronic device 301 as shown in FIG. 3B with the screen and various internal elements removed for clarity so that operation of the magnet assisted actuator mechanism (which may include actuators 509a-509b, wedges 508a-508b, rails 520a-520b shown in FIGS. 5A and 5B, and magnetic elements 521a-b and 522a-b shown in FIG. 5B) can be better seen.

FIG. 5B is a top plan view of the view shown in FIG. 5A with the bumpers, pivots, and springs removed for clarity so that operation of the magnet assisted actuator mechanism can be better seen. Contrasted with the push-push mechanism of the first embodiment discussed above and illustrated in FIGS. 4A-4I, in this second embodiment the wedges 508a-508b may be moveably mounted (such as on one or more linear bearings that are not shown) on one or more rails 520a-520b such that the wedges 508a-508b may slide in at least two directions 515a and 515b when driven by an actuator 509a-509b (which may be a linear motor).

As also illustrated, this second embodiment may include multiple magnetic elements 521a-521b and 522a-522b. As shown, the magnetic elements 521a-521b are coupled to the wedges 508a-508b and the magnetic elements 522a-522b are coupled to the housing 307. However, it is understood that this is an example and the magnetic elements 521a-521b and 522a-522b may be otherwise coupled without departing from the scope of the present disclosure.

Although the actuators 509a-509b, 520a-520b, and other mechanical elements are illustrated and described as being oriented in particular directions and moving in particular ways, it is understood that this is an example. In various implementations involving such actuators, rails, and other mechanical elements, such may be oriented in and/or move in different ways without departing from the scope of the present disclosure.

Figure 5C:
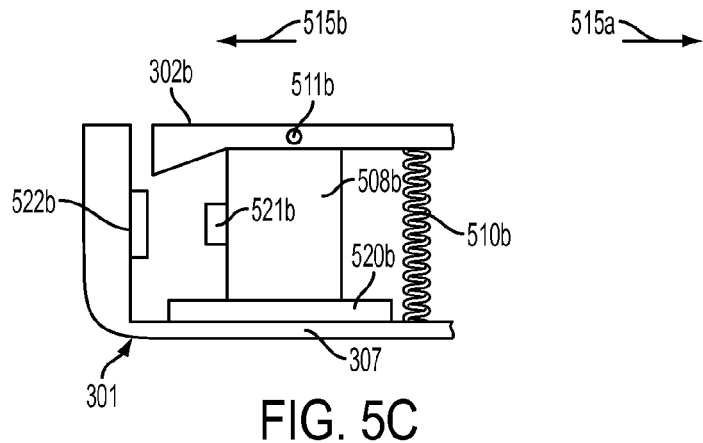
FIG. 5C is a cross sectional view of the second embodiment of the example FIG. 5A taken along the line 4C-4C of FIG. 3B while the wedge is in the stowed wedge position.
Figure 5D:
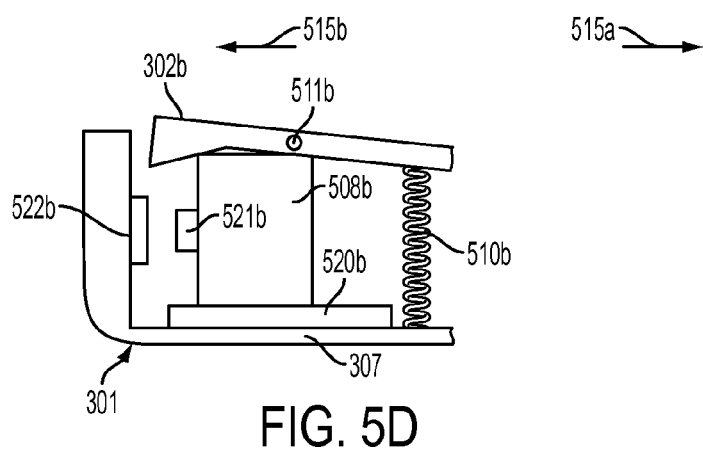
FIG. 5D illustrates the view of FIG. 5C while the wedge is in the intermediate wedge position.
Figure 5E:
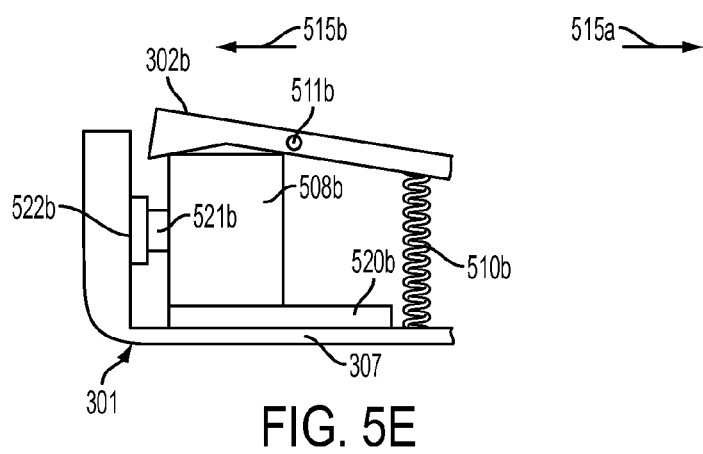
FIG. 5E illustrates the view of FIG. 5D while the wedge is in the deployed wedge position.

FIG. 5C is a cross sectional view of the second embodiment of the example FIG. 5A taken along the line 4C-4C of FIG. 3B while the wedge 508b is in a stowed wedge position. When the wedge 508b is in the stowed wedge position, the actuator 509b may push the wedge 508b in a first direction 515b to the intermediate wedge position as shown in FIG. 5D. From the intermediate wedge position, the magnetic elements 521b may attract the magnetic elements 522b to pull the wedge 508b from the intermediate wedge position to a deployed wedge position. FIG. 5E illustrates the wedge 508b in the deployed wedge position. As illustrated, this movement may cause the wedge 508b to force the bumper 302b into the deployed position, pivoting the bumper 302b on the pivot 511b and compressing the spring 510b.

While the wedge 508b is in the deployed wedge position shown in FIG. 5E, the attraction between the magnetic elements 521b and 522b may restrict movement of the wedge 508b back toward the stowed wedge position, which in turn may restrict the bumper 302b from moving back to the stowed position. As such, the bumper 302b may not return to the stowed position upon impact and cause the screen 306 to contact a surface despite the bumper 302b.

When the wedge 508b is in the deployed wedge position shown in FIG. 5E, the actuator 509b may push the wedge 508b in a second direction 515a. This movement may break the attraction of the magnetic elements 521b and 522b and move the wedge 508b through the intermediate wedge position shown in FIG. 5D back to the stowed wedge position shown in FIG. 5C.

Figure 6A:
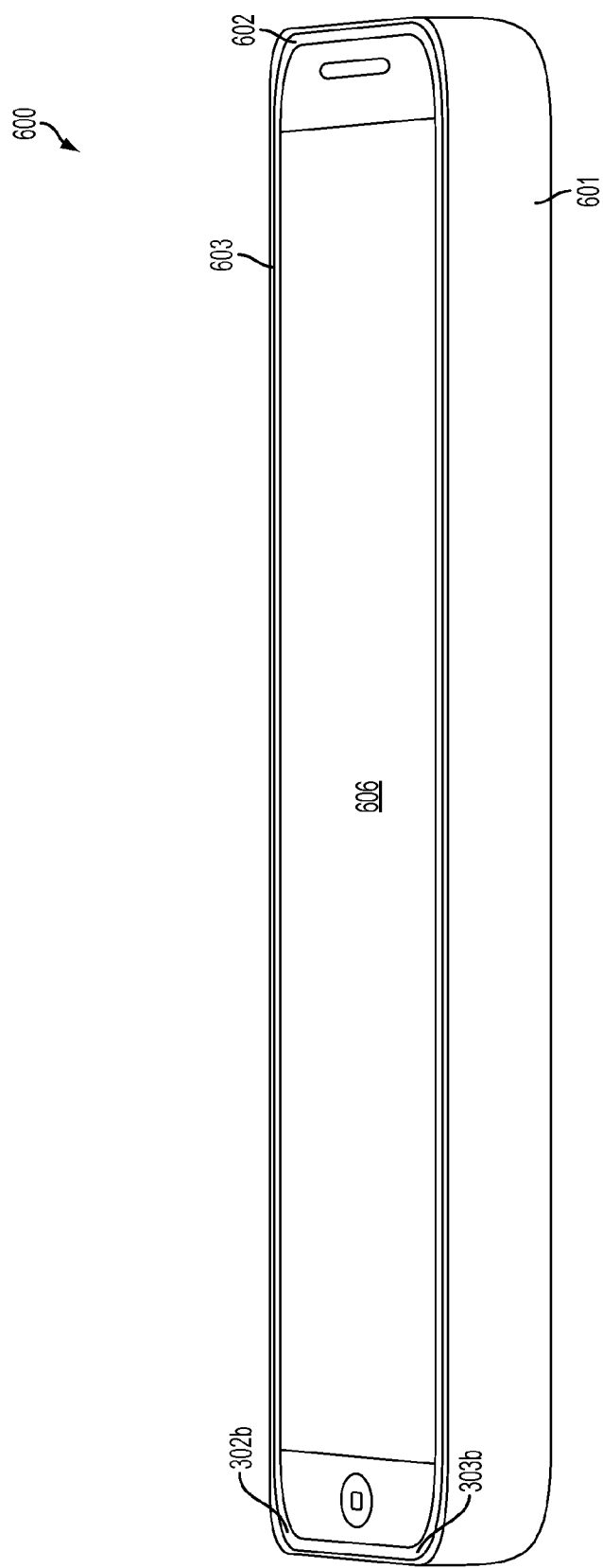
FIG. 6A is an isometric view illustrating a second example of an electronic device that may be used in the example system of FIG. 1A.

FIG. 6A is an isometric view 600 illustrating a second example of an electronic device 601 that may be used in the example system of FIG. 1A. To contrast with the first example electronic device 301 shown in FIG. 3A, the second example electronic device 601 includes a bumper 602 that is formed of one or more piezoelectric materials around a screen 606 and is operable to extend through an aperture 603 in the electronic device 601.

The piezoelectric material may expand when voltage is applied. When voltage is not currently applied, the bumper 602 may be in the stowed position, flush with and/or positioned beneath the screen 606, as shown in FIG. 6B.

Figure 6B:
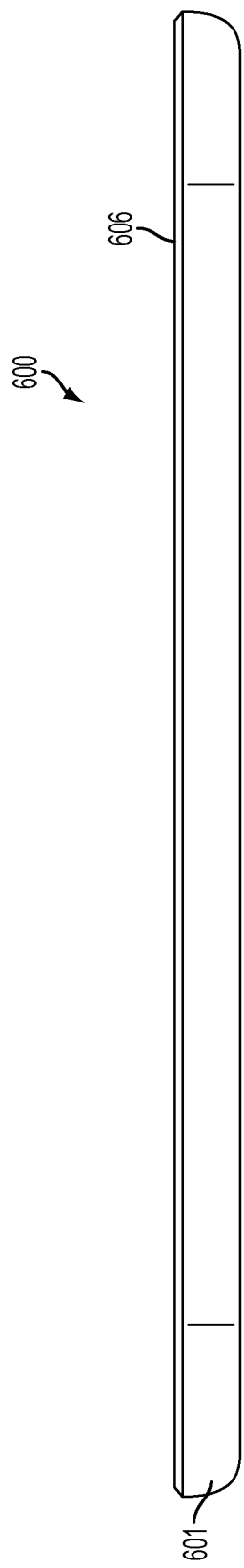
FIG. 6B is a front side plan view of the second example system of FIG. 6A with the bumper in the stowed position.
Figure 6C:
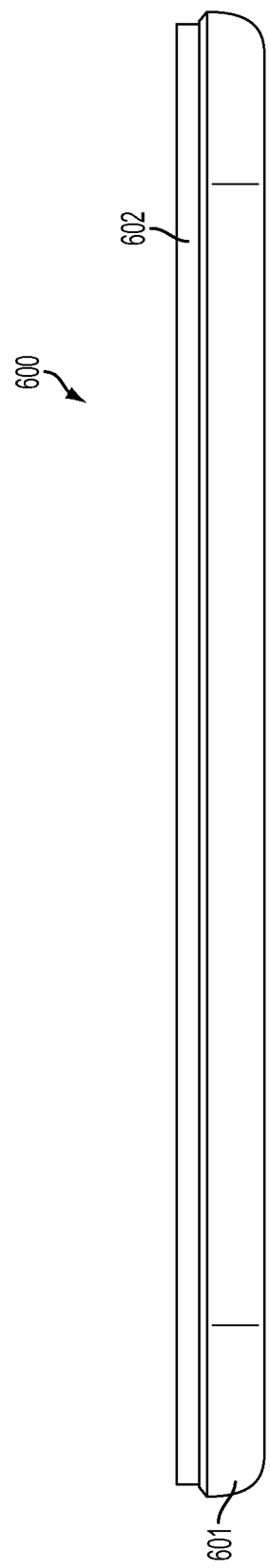
FIG. 6C illustrates the view shown in FIG. 6B with the bumper in the deployed position.

However, when voltage is applied to the piezoelectric material, the piezoelectric material may expand, moving the bumper 602 to the deployed position shown in FIG. 6C where the bumper 602 projects above (or stands proud of) the screen 606. Subsequently, when the current is no longer applied, the piezoelectric material may retract, moving the bumper 602 again to the stowed position shown in FIG. 6B.

Figure 7:
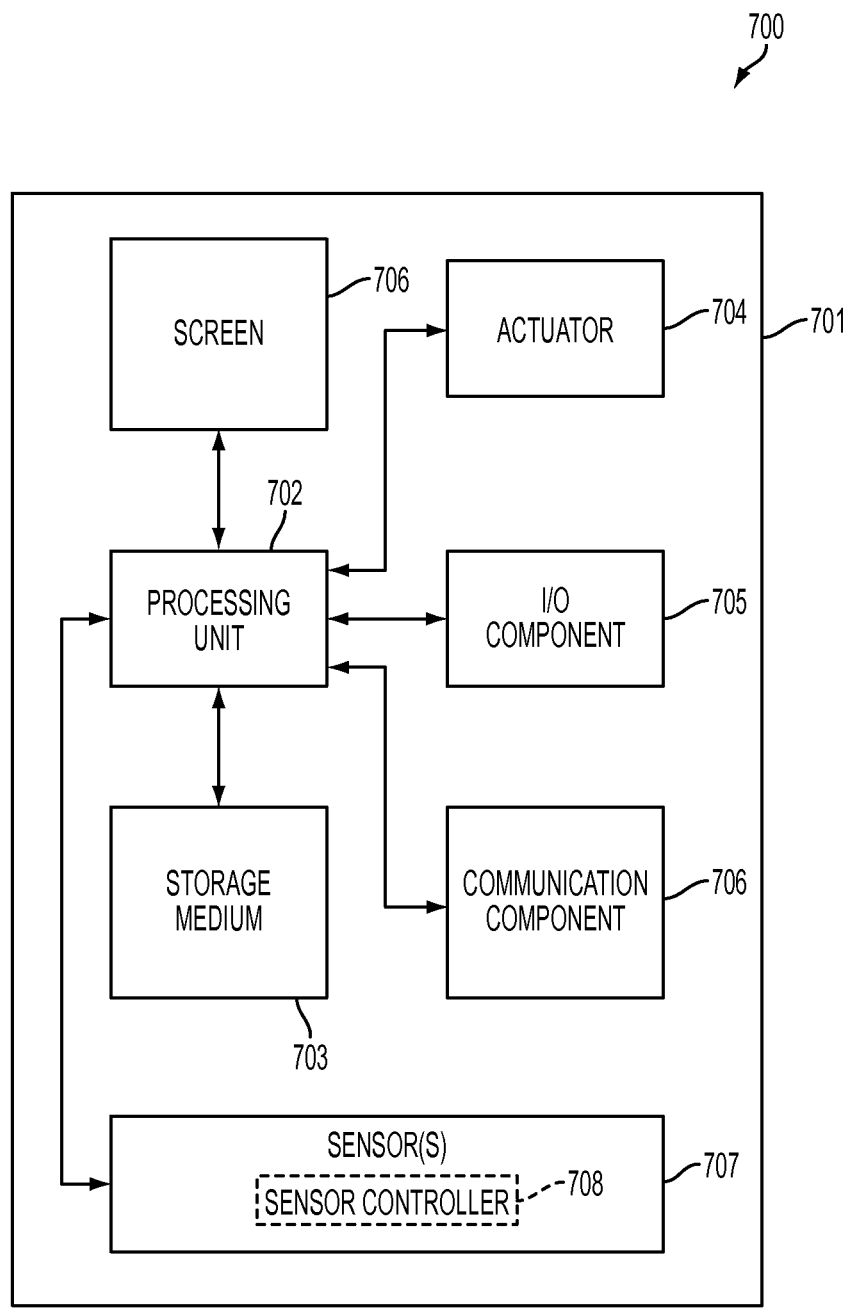
FIG. 7 is a block diagram illustrating the functional relationship of possible components of a system for screen protection. The system may be one or more of the example systems of FIGS. 1A-6B.

FIG. 7 is a block diagram illustrating the functional relationship of possible components of a system 700 for screen protection. The system 700 may be one or more of the example systems of FIGS. 1A-6B. Although particular components are illustrated, it is understood that this is an example. In various implementations, the electronic device 701 may include one or more components not shown, omit one or more components shown, and/or may include components configured in a different functional relationship without departing from the scope of the present disclosure.

In some implementations, the electronic device 701 may include one or more processing units 702 and/or other controllers, one or more non-transitory storage media 703 (which may take the form of, but is not limited to, a magnetic storage medium; optical storage medium; magneto-optical storage medium; read only memory; random access memory; erasable programmable memory; flash memory; and so on), one or more user input/output components 705 (such as one or more buttons, touch screens, keyboards, mice, virtual keyboards, track pads, touch pads, displays, speakers, microphones, and/or other such user input/output components), one or more communication components 706 (such as one or more WiFi antennas, Bluetooth antennas, Ethernet adapters, near field communication antennas, and/ or other such communication components), one or more sensors 707 (such as one or more accelerometers, gyroscopes, inertial sensors, motion sensors, cameras, and/or other sensors operable to detect when the electronic device 701 experiences a drop event and/or a combination thereof) one or more screens 706, one or more motors and/or other actuators 704 (which may be an actuator 409a-409b that moves a wedge 408a-408b such as in FIGS. 4A-4I, an actuator 509a-509b that moves a wedge 508a-508b such as in FIGS. 5A-5E, and/or a bumper 602 itself such as in FIGS. 6A-6C), and so on.

In some implementations, the sensor 707 may include a sensor controller 708. In various cases, the processing unit and/or other controller 702 of the electronic device 701 may have a variety of operating states, such as a normal operating state and a sleep state. One or more such states (such as a sleep state) may be a reduced power and/or powered down state where the processing unit and/or other controller 702 performs no and/or fewer operations. In such a state, the processing unit and/or other controller 702 may not be operable to instruct the sensor to monitor whether or not a drop event is occurring. In order to perform such an action, the processing unit and/or other controller 702 may need to shift to the normal operating state. However, the sensor controller 708 may be operable to monitor for the occurrence of a drop event while the processing unit and/or other controller 702 is in such a reduced power state, powered down state, sleep state, and/or other state. In this way, the sensor controller 708 may enable the sensor to detect the occurrence of a drop event while other components of the electronic device 701 are not powered or are powered at a reduced level. In some cases, the sensor controller 708 may also shift between various powered states, but may shift to a state where a drop event can be detected by the sensor 707 more frequently than other components of the electronic device 701 may be shifted to higher powered and/or more active states.

As described above and illustrated in the accompanying figures, the present disclosure discloses systems, apparatuses and methods for screen protection. An electronic device may include at least one screen. One or more bumpers may be moveable between at least a stowed position where the bumper is flush or below the screen and a deployed position where at least a portion of the bumper projects above the screen. One or more sensors (such as an accelerometer, gyroscope, inertial sensor, motion sensor, camera, and/or other sensor and/or a combination thereof) may detect when the electronic device is subject to one or more drop events. When a drop event is detected, the bumper may move to the deployed position. In this way, the bumper may function as a shock absorber and prevent the screen from contacting a surface onto which the electronic device is dropped, protecting the screen.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A system for screen protection, comprising:
an electronic device including at least one screen;
at least one bumper pivotally moveable through a housing aperture between at least a stowed position and a deployed position wherein at least a portion of the at least one bumper projects above the at least one screen in the deployed position; and
at least one sensor that is configured to detect when electronic device is subject to a drop event;
wherein the at least one bumper is configured to move from the stowed position to the deployed position when the at least one sensor detects that the electronic device is subject to the drop event.

2. The system of claim 1, wherein the at least one bumper is positioned at least partially around at least two sides of the at least one screen.

3. The system of claim 1, wherein the at least one bumper is spring biased toward the stowed position.

4. The system of claim 1, wherein the at least one bumper is moveable between the stowed position and the deployed position by at least one push-push mechanism that is connected to the at least one bumper and driven by at least one actuator.

5. The system of claim 4, wherein the at least one push-push mechanism includes a wedge with at least one cam that travels along at least one cam path when the wedge is pushed by the at least one actuator wherein the wedge pushes the at least one bumper when pushed by the at least one actuator.

6. The system of claim 4, wherein at least one of:
the at least one cam travels along the at least one cam path from a stowed cam path position to a first over-travel cam path position when the wedge is pushed by the at least one actuator and then from the first over-travel cam path position to a deployed cam path position when the wedge is no longer pushed by the at least one actuator, the wedge maintaining the at least one bumper in the deployed position when the at least one cam is in the deployed cam path position; or
the at least one cam travels along the at least one cam path from the deployed cam path position to a second over-travel cam path position when the wedge is pushed by the at least one actuator and then from the second over-travel cam path position to the stowed cam path position when the wedge is no longer pushed by the at least one actuator, the wedge allowing the at least one bumper to be the stowed position when the at least one cam is in the stowed cam path position.

7. The system of claim 4, wherein the actuator is a linear actuator.

8. The system of claim 1, wherein the at least one bumper is moveable between the stowed position and the deployed position by a wedge that is operable to contact the at least one bumper and is at least partially driven by at least one actuator.

9. The system of claim 8, wherein the at least one actuator drives the wedge from a stowed wedge position to an intermediate wedge position, the wedge allowing the at least one bumper to be in the stowed position when the wedge is in the stowed wedge position.

10. The system of claim 9, wherein multiple magnetic elements attract to pull the wedge from the intermediate wedge position to a deployed wedge position, the wedge maintaining the at least one bumper in the deployed position when the wedge is in the deployed wedge position.

11. The system of claim 10, wherein the at least one actuator drives the wedge from the deployed wedge position to the stowed wedge position.

12. The system of claim 11, wherein the at least one actuator driving the wedge from the deployed wedge position to the stowed wedge position breaks the attraction between the multiple magnetic elements.

13. The system of claim 1, wherein the at least one bumper is incorporated into at least one case that couples to the electronic device.

14. The system of claim 13, wherein the at least one sensor is incorporated into the at least one case.

15. A system for screen protection, comprising:
an electronic device including a screen;
a bumper that comprises piezoelectric material and is moveable between a stowed position and a deployed position wherein at least a portion of the bumper projects above the screen in the deployed position; and
a sensor responsive to a drop event;
wherein, in response to an output from the sensor, the bumper is configured to move from the stowed position to the deployed position.

16. The system of claim 15, wherein the bumper moves from the stowed position to the deployed position when a voltage is applied to the piezoelectric material.

17. The system of claim 16, wherein the bumper moves from the deployed position to the stowed position when the voltage is no longer applied to the piezoelectric material.

18. A system for display protection, comprising:
a device including a display;
a bumper configured to rotate through an aperture into a deployed position; and
a sensor that produces a signal when device is subject to a drop event; wherein
the bumper rotates into the deployed position based on the sensor signal; and
an edge of the bumper projects above the display in the deployed position.

19. The system of claim 18, further comprising:
an external case that couples to the device, wherein:
the bumper is coupled to the external case.

20. The system of claim 18, wherein:
the bumper is biased toward a stowed position; and
the edge of the bumper is below the display in the stowed position.

* * * * *